United States Patent
Ding et al.

(10) Patent No.: US 11,845,702 B2
(45) Date of Patent: Dec. 19, 2023

(54) METHOD FOR FABRICATING POROUS CERAMIC HEATING BODY

(71) Applicant: ALD GROUP LIMITED, Shenzhen (CN)

(72) Inventors: Yi Ding, Shenzhen (CN); Hongsheng Cheng, Shenzhen (CN)

(73) Assignee: ALD GROUP LIMITED, Shenzhen (CN)

( * ) Notice: Subject to any disclaimer, the term of this patent is extended or adjusted under 35 U.S.C. 154(b) by 759 days.

(21) Appl. No.: 16/907,401

(22) Filed: Jun. 22, 2020

(65) Prior Publication Data
US 2020/0317587 A1 Oct. 8, 2020

Related U.S. Application Data

(63) Continuation-in-part of application No. PCT/CN2018/074113, filed on Jan. 25, 2018.

(30) Foreign Application Priority Data

Dec. 21, 2017 (CN) .......................... 201711397395.3

(51) Int. Cl.
*C04B 35/64* (2006.01)
*C04B 41/51* (2006.01)
(Continued)

(52) U.S. Cl.
CPC ........ *C04B 41/5144* (2013.01); *B05D 3/0218* (2013.01); *B23K 1/0008* (2013.01);
(Continued)

(58) Field of Classification Search
CPC .............. B05D 3/0218; B05D 2203/30; B23K 1/0008; B23K 1/0016; B23K 2101/36; B23K 2101/38; B28B 1/14; B29C 67/0037; B29C 2791/006; B29K 2505/00; B29L 2031/779; C04B 35/62615; C04B 35/64; C04B 37/006; C04B 38/0645; C04B 38/067; C04B 38/0675; C04B 38/068; C04B 41/515; C04B 41/88; C04B 2235/606; C04B 2235/6538;
(Continued)

(56) References Cited

U.S. PATENT DOCUMENTS

2007/0003750 A1* 1/2007 Kim ..................... C04B 35/6263
428/312.2

FOREIGN PATENT DOCUMENTS

| CN | 105218137 A | * | 1/2016 | ............. C04B 35/01 |
| WO | WO-2005002279 A1 | * | 1/2005 | ............. H05B 3/141 |

OTHER PUBLICATIONS

Translation of CN 105218137 A (published on Jan. 6, 2016).*
Translation of WO 2005002279 A1 (published on Jan. 6, 2005).*

* cited by examiner

*Primary Examiner* — Leo B Tentoni
(74) *Attorney, Agent, or Firm* — Jordan IP Law, LLC; Todd A. Vaughn

(57) ABSTRACT

A method for fabricating a porous ceramic heating body, and a method of fabricating a heating body. The method for fabricating includes, in sequence, mixing, ball-milling, defoaming, molding, and drying, pore-forming agent discharging, sintering, and electrode leading. The whole method is simple, and by using a box furnace to sinter the green body under an oxidizing atmosphere and normal pressure, the fabricated ceramic heating body is heated uniformly and the heating efficiency is high.

18 Claims, 5 Drawing Sheets

(51) Int. Cl.
    *B28B 1/14*      (2006.01)
    *C04B 38/06*     (2006.01)
    *C04B 41/00*     (2006.01)
    *C04B 41/88*     (2006.01)
    *H05B 3/03*      (2006.01)
    *H05B 3/16*      (2006.01)
    *B23K 1/00*      (2006.01)
    *C04B 37/00*     (2006.01)
    *C04B 35/626*    (2006.01)
    *B05D 3/02*      (2006.01)
    *B29C 67/00*     (2017.01)
    *B23K 101/36*    (2006.01)
    *B29L 31/00*     (2006.01)
    *B23K 101/38*    (2006.01)
    *B29K 505/00*    (2006.01)

(52) U.S. Cl.
    CPC .............. *B23K 1/0016* (2013.01); *B28B 1/14* (2013.01); *B29C 67/0037* (2013.01); *C04B 35/62615* (2013.01); *C04B 37/006* (2013.01); *C04B 38/067* (2013.01); *C04B 38/068* (2013.01); *C04B 38/0645* (2013.01); *C04B 38/0655* (2013.01); *C04B 38/0675* (2013.01); *C04B 41/009* (2013.01); *C04B 41/515* (2013.01); *C04B 41/88* (2013.01); *H05B 3/03* (2013.01); *H05B 3/16* (2013.01); *B05D 2203/30* (2013.01); *B23K 2101/36* (2018.08); *B23K 2101/38* (2018.08); *B29C 2791/006* (2013.01); *B29K 2505/00* (2013.01); *B29L 2031/779* (2013.01); *C04B 2235/606* (2013.01); *C04B 2235/661* (2013.01); *H05B 2203/017* (2013.01)

(58) Field of Classification Search
    CPC ....... C04B 2235/661; C23C 2/04; C23C 4/08; C25D 5/54
    USPC ......... 264/44, 101, 610, 618, 620, 628, 654, 264/660, 678; 427/126.2, 314, 385.5, 427/422, 423.2; 205/271; 228/262.8
    See application file for complete search history.

METHOD FOR FABRICATING POROUS CERAMIC HEATING BODY

CROSS REFERENCE TO RELATED APPLICATIONS

The present application is a continuation-in part of International Application No. PCT/CN2018/074113 (filed on Jan. 25, 2018), which itself claims priority to Chinese Patent Application No. CN 201711397395.3 (filed on Dec. 21, 2017), each of which is hereby incorporated by reference in their complete entireties.

TECHNICAL FIELD

The present application relates to the technical field of fabricating heating body, and more particularly to a method for fabricating a porous ceramic heating body.

BACKGROUND

Porous ceramics can be used in various applications. Porous ceramics are widely used in the fields of environmental protection, chemical industry, metallurgy, medicine and biomedicine as solid-liquid separation media, liquid filtration purification, gas purification and catalyst carriers for chemical reactions. In addition, porous ceramics can also be used as a heating source to form a porous ceramic heating body, which is widely used in electronic atomization equipment. The porous ceramic heating body in the prior art is to sinter a heating wire onto a surface of the porous ceramic body or to print the resistive slurry onto the surface of the porous ceramic body. During the heating process of the two porous ceramic heating bodies, the periphery of the resistance wire or the resistance heating film is relatively hotter, which resulting in uneven heating of the porous ceramic heating body.

SUMMARY

In order to overcome the shortcomings of the prior art, the present application provides a method for fabricating a porous ceramic heating body, the porous ceramic heating body fabricated by the method has both porous and heating body properties, and the heating body is heated more uniformly during the heating process.

The technical scheme adopted by the present application is to provide a method for fabricating a porous ceramic heating body, with improvements in that the method includes steps as follow:

A), mixing: taking diatomaceous earth accounting for 15-45%, pore-forming agent accounting for 5-19%, nano-silica solution accounting for 0-2%, deionized water accounting for 20-40%, resistive slurry accounting for 20-35%, and organic solvent accounting for 10-25% according to weight percentage; and then evenly mixing and stirring to obtain porous ceramic substrate slurry;

B), ball-milling: adding grinding balls to the porous ceramic substrate slurry obtained in the step A), and putting them into a ball-milling tank to conduct wet ball milling for a period of 4-24 hours;

C), defoaming: defoaming the porous ceramic substrate slurry after wet ball milling in the step B) under a vacuum condition;

D), molding and drying: casting the porous ceramic substrate slurry obtained in the step C) by a casting machine to obtain a ceramic substrate with a desired shape, and drying the ceramic substrate to form a green body;

E), discharging of pore-forming agent: placing the green body obtained in the step D) into a graphite crucible and burying it into isolating powders, and then discharging the pore-forming agent of the green body buried in the isolating powders using a box furnace under normal pressure, and the furnace atmosphere is oxygen;

F), sintering: placing the green body obtained in the step E) into a graphite crucible and burying it into isolating powders, and then sintering the green body buried in the isolating powders using a box furnace under normal pressure, and the sintering atmosphere is oxygen, wherein the green body is sintered to obtain a semi-finished product of porous ceramic heating body;

G), electrode leading: performing a nickel plating process onto two ends of the semi-finished product of porous ceramic heating body obtained in the step F), and then performing brazing at a position proceeded with the nickel plating to lead out electrode to obtain a finished product of porous ceramic heating body.

In above method, the step E) is specifically: placing the green body obtained in the step D) into a graphite crucible and burying it into isolating powders, and then discharging the pore-forming agent of the green body buried in the isolating powders using a box furnace under normal pressure, and the furnace atmosphere is oxygen; and a heating rate is 1-20° C./min, a temperature of discharging of pore-forming agent is 300-600° C., and a holding time is 2-12 hours.

In above method, the step F) is specifically: placing the green body obtained in the step E) into a graphite crucible and burying it into isolating powders, and then sintering in the box furnace, and a heating rate is 1-20° C./min, a sintering temperature is 900-1400° C., and a holding time is 10-20 hours, wherein the green body is sintered to obtain the semi-finished product of porous ceramic heating body.

In above method, in the step A), the porous ceramic substrate slurry is composed of raw materials with following weight percentages as follows:
the diatomaceous earth accounting for 15%,
the pore-forming agent accounting for 5%,
the nano-silica solution accounting for 1%,
the deionized water accounting for 20%,
the resistive slurry accounting for 34%, and
the organic solvent accounting for 25%.

In above method, in the step A), the porous ceramic substrate slurry is composed of raw materials with following weight percentages as follows:
the diatomaceous earth accounting for 35%,
the pore-forming agent accounting for 12%,
the nano-silica solution accounting for 2%,
the deionized water accounting for 21%,
the resistive slurry accounting for 20%, and
the organic solvent accounting for 10%.

In above method, in the step A), the porous ceramic substrate slurry is composed of raw materials with following weight percentages as follows:
the diatomaceous earth accounting for 45%,
the pore-forming agent accounting for 5%,
the deionized water accounting for 20%,
the resistive slurry accounting for 20%, and
the organic solvent accounting for 10%.

In above method, the resistive slurry comprises one or more selected from stainless steel, nickel chromium, and silver palladium.

In above method, the pore-forming agent is one or more selected from starch, wood chips, carbon powder, and plastic microspheres.

The beneficial effects of the present application are: in the method, the mixture of ceramic powder and resistive slurry is co-fired. The fabricated porous ceramic heating body is a composite, which has both porous and heating body properties. The whole heating body is heated more uniformly. The shortcoming of that only surface being heated leads to uneven heating is overcome; the fabricated porous ceramic heating body is uniformly heated and has high heating efficiency, and the method is simple and large-scale production can be utilized.

DETAILED DESCRIPTION

The present application will be further described below with reference to the drawings and embodiments.

The concept, specific structure, and technical effects of the present application will be described clearly and completely in conjunction with the embodiments and drawings to fully understand the purpose, features, and effects of the present application. Obviously, the described embodiments are only a part of the embodiments of the present application, but not all the embodiments. Based on the embodiments of the present application, other embodiments obtained by those skilled in the art without paying creative efforts belong to the scope of protection of the present application. In addition, all the coupling/connecting relationships involved in the present application are not only directly connected by members, but refer to that a more optimal connection structure can be formed by adding or reducing connection accessories according to the specific implementation. The various technical features in the creation of the present application can be combined interactively on the premise that they do not contradict each other.

Embodiment 1

Figure 1:
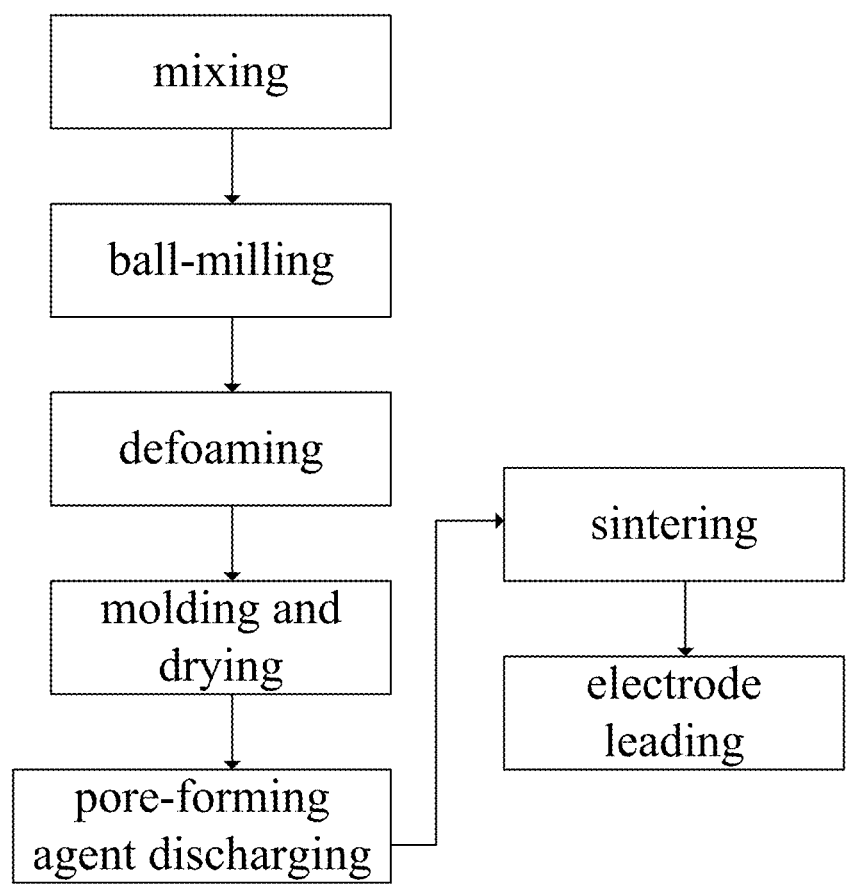
FIG. 1 is a flow chart of a method for fabricating a porous ceramic heating body according to the present application.
Figure 2:
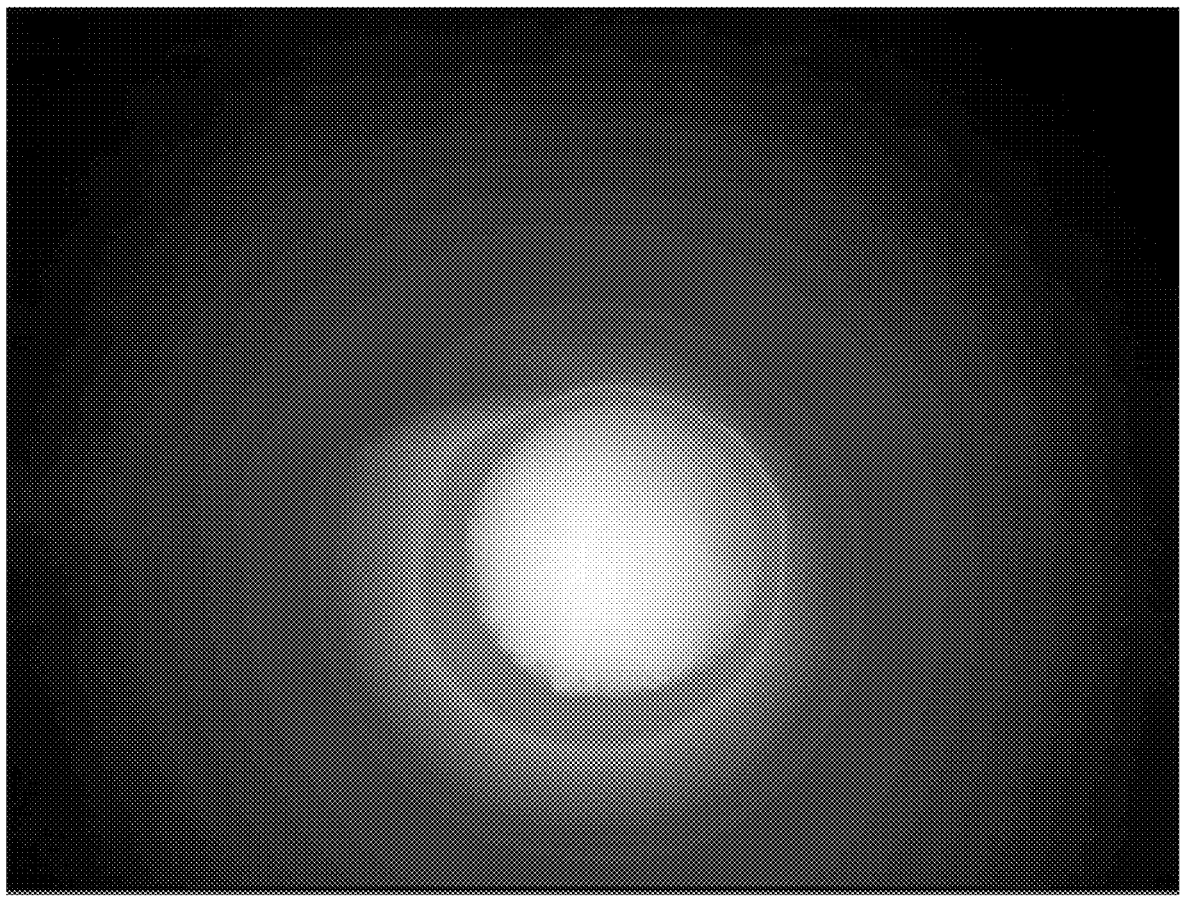
FIG. 2 is an infrared thermogram of an embodiment 1 according to the present application.
Figure 3:
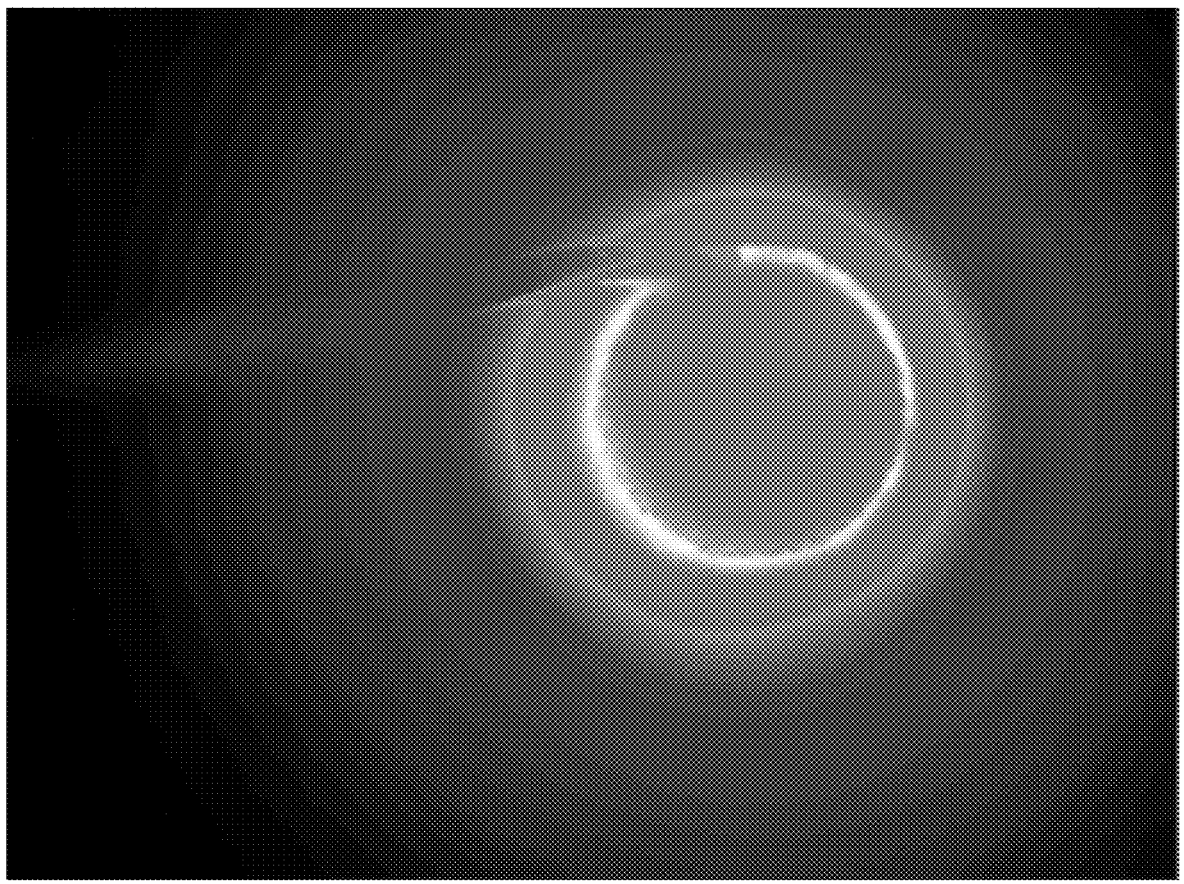
FIG. 3 is an infrared thermogram of a comparative embodiment 1 according to the present application.
Figure 4:
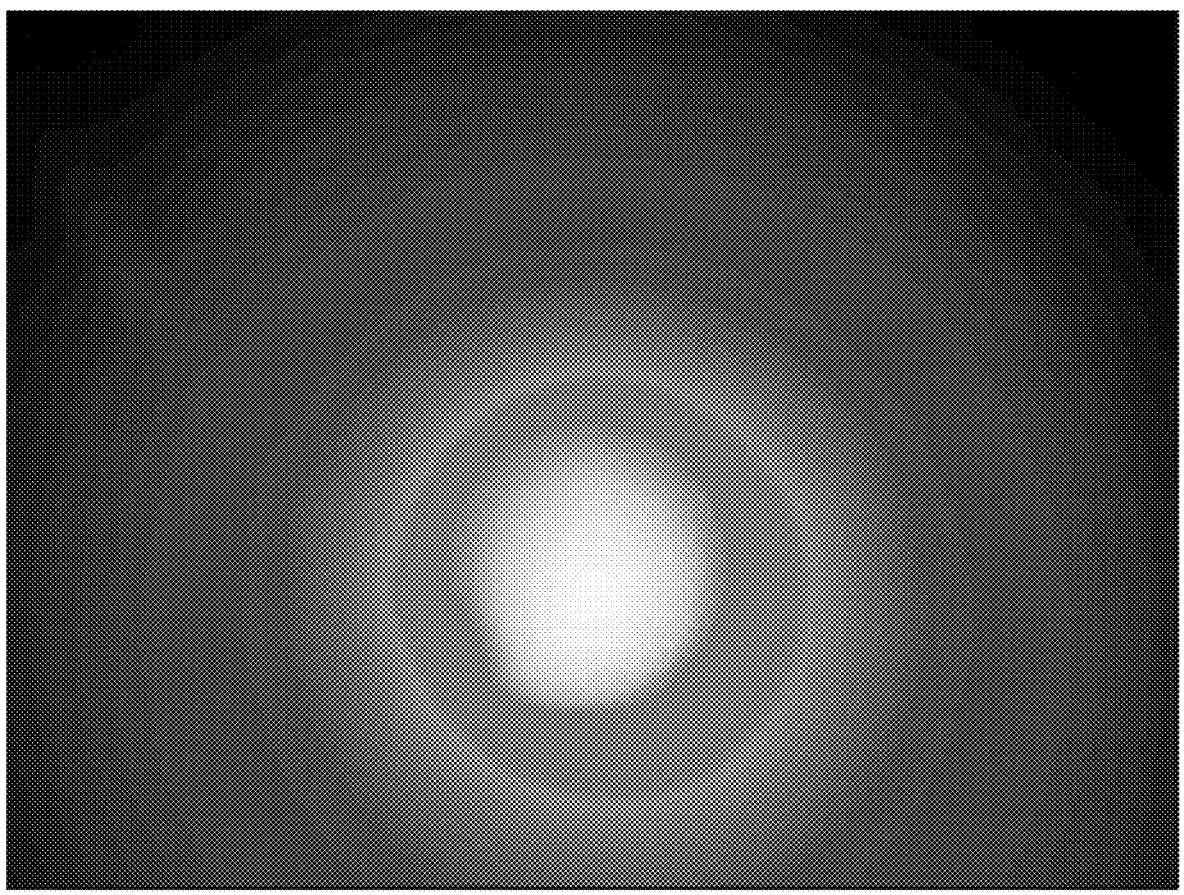
FIG. 4 is an infrared thermogram of an embodiment 2 according to the present application.
Figure 5:
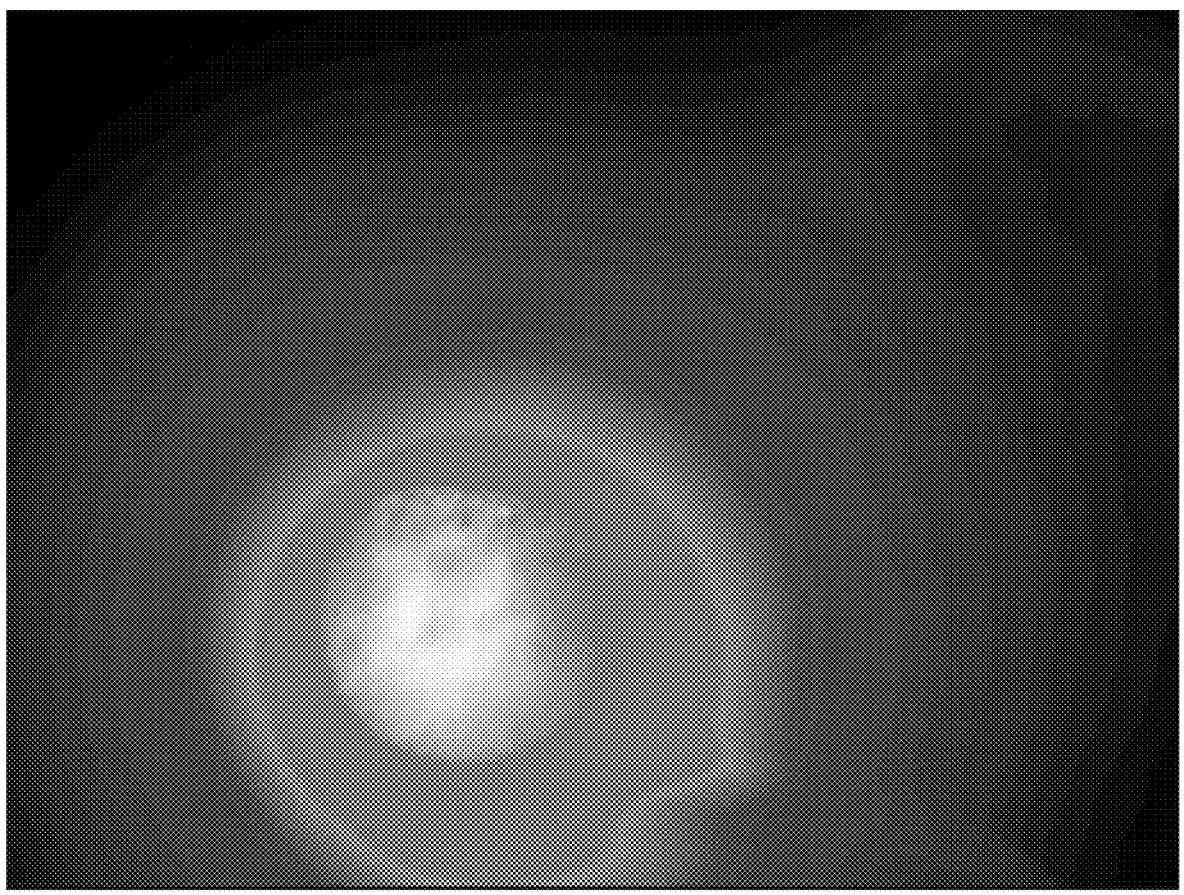
FIG. 5 is an infrared thermogram of an embodiment 3 according to the present application.

Referring to FIG. 1, the present embodiment provides a method for fabricating a porous ceramic heating body. In particular, the method includes the following steps:

A), mixing: taking diatomaceous earth accounting for 15%, starch accounting for 5%, nano-silica solution accounting for 1%, deionized water accounting for 20%, stainless steel slurry accounting for 34%, and organic solvent accounting for 25% according to weight percentage; and then evenly mixing and stirring to obtain porous ceramic substrate slurry;

B), ball-milling: adding grinding balls to the porous ceramic substrate slurry obtained in the step A), and putting them into a ball-milling tank to conduct wet ball milling for 4 hours;

C), defoaming: defoaming the porous ceramic substrate slurry after wet ball milling in the step B) under a vacuum condition;

D), molding and drying: casting the porous ceramic substrate slurry obtained in the step C) by a casting machine to obtain a ceramic substrate with a desired shape, and drying the ceramic substrate to form a green body;

E), discharging of starch: placing the green body obtained in the step D) into a graphite crucible and burying it into isolating powders, and then discharging the starch of the green body buried in the isolating powders using a box furnace under normal pressure, and the furnace atmosphere is oxygen; among then, the heating rate is 1° C./min, the temperature of discharging the starch is 300° C., and the holding time is 2 hours;

F), sintering: placing the green body obtained in the step E) into a graphite crucible and burying it into isolating powders, and then sintering in a sinter furnace, under normal pressure, among then, the heating rate is 1° C./min, the temperature of discharging the starch is 900° C., and the holding time is 10 hours, and the green body is sintered to obtain a semi-finished product of porous ceramic heating body;

G), electrode leading: performing a nickel plating onto two ends of the semi-finished product of porous ceramic heating body obtained in the step F), and then performing brazing at a position proceeded with the nickel plating to lead out electrode to obtain a finished product of porous ceramic heating body.

Comparative Embodiment 1

In particular, the method includes the following steps:

A), mixing: taking diatomaceous earth accounting for 23%, starch accounting for 8%, nano-silica solution accounting for 2%, deionized water accounting for 30%, and organic solvent accounting for 38% according to weight percentage; and then evenly mixing and stirring to obtain porous ceramic substrate slurry;

B), ball-milling: adding grinding balls to the porous ceramic substrate slurry obtained in the step A), and putting them into a ball-milling tank to conduct wet ball milling for 4 hours;

C), defoaming: defoaming the porous ceramic substrate slurry after wet ball milling in the step B) under a vacuum condition;

D), molding and drying: casting the porous ceramic substrate slurry obtained in the step C) by a casting machine to obtain a ceramic substrate with a desired shape, and drying the ceramic substrate to form a green body;

E), discharging of starch: placing the green body obtained in the step D) into a graphite crucible and burying it into isolating powders, and then discharging the starch of the green body buried in the isolating powders using a box furnace under normal pressure, and the furnace atmosphere is oxygen; among then, the heating rate is 1° C./min, the temperature of discharging the starch is 300° C., and the holding time is 2 hours;

F), sintering: placing the green body obtained in the step E) into a graphite crucible and burying it into isolating powders, and then sintering in a sinter furnace, under normal pressure, among then, the heating rate is 1° C./min, the temperature of discharging the starch is 900° C., and the holding time is 10 hours, and the green body is sintered to obtain a semi-finished product of porous ceramic heating body;

G), coating: coating a stainless steel resistive slurry onto an outer surface of the semi-finished product of the porous ceramic heating body substrate obtained in the step F) according to desired thickness, to form a layer of a heating film onto the outer surface of the porous ceramic substrate;

H), metalizing sintering: placing the semi-finished product of the porous ceramic heating body substrate obtained in the step G) with the heating film into a graphite crucible, and then placing into a sintering furnace for metalizing sintering, among then, the heating rate is 2° C./min, the temperature for metallizing and sintering is 850° C., and the holding time is 1 hour; in the step of metalizing sintering, the resistance heating film is sintered and attached onto the outer surface of the porous ceramic heating body substrate;

I), electrode leading: performing a nickel plating process onto two ends of the semi-finished product of porous ceramic heating body obtained in the step F), and then performing brazing at a position after the nickel plating process to lead out electrode to obtain a finished product of porous ceramic heating body.

Embodiment 2

Referring to FIG. 1, the present embodiment provides a method for fabricating a porous ceramic heating body. In particular, the method includes the following steps:

A), mixing: taking diatomaceous earth accounting for 35%, starch accounting for 12%, nano-silica solution accounting for 2%, deionized water accounting for 21%, nickel chromium slurry accounting for 20%, and organic solvent accounting for 10% according to weight percentage; and then evenly mixing and stirring to obtain porous ceramic substrate slurry;

B), ball-milling: adding grinding balls to the porous ceramic substrate slurry obtained in the step A), and putting them into a ball-milling tank to conduct wet ball milling for 24 hours;

C), defoaming: defoaming the porous ceramic substrate slurry after wet ball milling in the step B) under a vacuum condition;

D), molding and drying: casting the porous ceramic substrate slurry obtained in the step C) by a casting machine to obtain a ceramic substrate with a desired shape, and drying the ceramic substrate to form a green body;

E), discharging of starch: placing the green body obtained in the step D) into a graphite crucible and burying it into isolating powders, and then discharging the starch of the green body buried in the isolating powders using a box furnace under normal pressure, and the furnace atmosphere is oxygen; among then, the heating rate is 20° C./min, the temperature of discharging the starch is 600° C., and the holding time is 12 hours;

F), sintering: placing the green body obtained in the step E) into a graphite crucible and burying it into isolating powders, and then sintering in a sinter furnace, under normal pressure, among then, the heating rate is 20° C./min, the temperature of discharging the starch is 1400° C., and the holding time is 20 hours, and the green body is sintered to obtain a semi-finished product of porous ceramic heating body;

G), electrode leading: performing a nickel plating onto two ends of the semi-finished product of porous ceramic heating body obtained in the step F), and then performing brazing at a position proceeded with the nickel plating to lead out electrode to obtain a finished product of porous ceramic heating body.

Embodiment 3

Referring to FIG. 1, the present embodiment provides a method for fabricating a porous ceramic heating body. In particular, the method includes the following steps:

A), mixing: taking diatomaceous earth accounting for 45%, starch accounting for 5%, deionized water accounting for 20%, silver palladium slurry accounting for 20%, and organic solvent accounting for 10% according to weight percentage; and then evenly mixing and stirring to obtain porous ceramic substrate slurry;

B), ball-milling: adding grinding balls to the porous ceramic substrate slurry obtained in the step A), and putting them into a ball-milling tank to conduct wet ball milling for 14 hours;

C), defoaming: defoaming the porous ceramic substrate slurry after wet ball milling in the step B) under a vacuum condition;

D), molding and drying: casting the porous ceramic substrate slurry obtained in the step C) by a casting machine to obtain a ceramic substrate with a desired shape, and drying the ceramic substrate to form a green body;

E), discharging of starch: placing the green body obtained in the step D) into a graphite crucible and burying it into isolating powders, and then discharging the starch of the green body buried in the isolating powders using a box furnace under normal pressure, and the furnace atmosphere is oxygen; among then, the heating rate is 10° C./min, the temperature of discharging the starch is 450° C., and the holding time is 7 hours;

F), sintering: placing the green body obtained in the step E) into a graphite crucible and burying it into isolating powders, and then sintering in a sinter furnace, under normal pressure, among then, the heating rate is 10° C./min, the temperature of discharging the starch is 1200° C., and the holding time is 15 hours, and the green body is sintered to obtain a semi-finished product of porous ceramic heating body;

G), electrode leading: performing a nickel plating process onto two ends of the semi-finished product of porous ceramic heating body obtained in the step F), and then performing brazing at a position proceeded with the nickel plating to lead out electrode to obtain a finished product of porous ceramic heating body.

In addition to starch, the pore-forming agent can also be wood chips, carbon powder, and plastic microspheres.

Taking heating body samples of embodiment 1, comparative embodiment 1, embodiment 2 and embodiment 3 and testing the following indicators 1), porosity: respectively testing the dry weight, wet weight and floating weight of porous ceramics by the Archimedes principle, and then calculating the porosity.

2), resistance: testing the resistance value with a resistance meter.

3), heating rate: using an infrared thermal camera to measure the temperature of the heating body samples in real time when heating power is 8 W, then calculating according to the following formula to obtain the heating rate:

$$V(hr)=(265-Tr)/t;$$

V(hr) represents heating rate; Tr represents room temperature; and t represents used time.

4), infrared thermogram: using an infrared thermal camera FLIR T450C to measure a cross-sectional temperature of the ceramic heating body, and take a thermogram. The infrared emissivity is set to 0.8, the heating electrode power supply is set to 6 W, and the macro lens distance is 20 mm.

The more uniform the color of the infrared thermogram, the more uniform the heating body being heated.

| embodiments | Indexes | | |
|---|---|---|---|
| | porosity/% | resistance/Ω | heating rate° C./s |
| Embodiment 1 | 45 | 1.1 | 100 |
| Comparative embodiment 1 | 63 | 1.1 | 160 |
| Embodiment 2 | 39 | 1.1 | 100 |
| Embodiment 3 | 30 | 1.1 | 100 |

Table 1 shows test results of each embodiment samples

As shown in Table 1 and FIGS. 2 to 5 that the heating rate of the porous ceramic heating body of the embodiment of the present application is slightly slower than that of the porous ceramic heating body coated with a resistance film, but the heating is more uniform.

In summary, the present application provides a method for fabricating a porous ceramic heating body. In the method, the mixture of ceramic powder and resistive slurry is co-fired. The fabricated porous ceramic heating body is a composite, which has both porous and heating body properties. The whole heating body is heated more uniformly. The shortcoming of that only surface being heated leads to uneven heating is overcome; the method is simple, and using a box furnace to sinter the green body under an oxidizing atmosphere and normal pressure, the production efficiency is high, the sintering temperature is low, which is conducive to achieving large-scale production; and the fabricated porous ceramic heating body is uniformly heated and has high heating efficiency.

The aforementioned embodiments are only preferred embodiments of the present application. For one of ordinary skill in the art, according to the thought of the present application, specific implementation modes and application scopes may be modified, and the content of the specification should not be interpreted as any limitation to the present application.

What is claimed is:

1. A method for fabricating a porous ceramic heating body, the method comprising:
   A) mixing, by taking diatomaceous earth accounting for 15-45%, pore-forming agent accounting for 5-19%, nano-silica solution accounting for 0-2%, deionized water accounting for 20-40%, resistive slurry accounting for 20-35%, and organic solvent accounting for 10-25% according to weight percentage, and then evenly mixing and stirring to obtain porous ceramic substrate slurry;
   B) ball-milling, by adding grinding balls to the porous ceramic substrate slurry obtained in step A), and putting them into a ball-milling tank to conduct wet ball milling for a period of 4-24 hours;
   C) defoaming the porous ceramic substrate slurry after wet ball milling in step B) under a vacuum condition;
   D) molding and drying, by casting the porous ceramic substrate slurry obtained in step C) by a casting machine to obtain a ceramic substrate with a desired shape, and drying the ceramic substrate to form a green body;
   E) discharging of pore-forming agent, by placing the green body obtained in step D) into a graphite crucible and burying it into isolating powders, and then discharging the pore-forming agent of the green body buried in the isolating powders using a box furnace under normal pressure, wherein the furnace atmosphere is oxygen;
   F) sintering, by placing the green body obtained in step E) into a graphite crucible and burying it into isolating powders, and then sintering the green body buried in the isolating powders using a box furnace under normal pressure, wherein the sintering atmosphere is oxygen, and wherein the green body is sintered to obtain a semi-finished product of porous ceramic heating body; and
   G) electrode leading, by performing a nickel plating process onto two ends of the semi-finished product of porous ceramic heating body obtained in step F), and then performing brazing at a position proceeded with the nickel plating process to lead out electrode to obtain a finished product of porous ceramic heating body.

2. The method of claim 1, wherein step E) further comprises: placing the green body obtained in step D) into a graphite crucible and burying it into isolating powders, and then discharging the pore-forming agent of the green body buried in the isolating powders using a box furnace under normal pressure, and the furnace atmosphere is oxygen; and a heating rate is 1-20° C./min, a temperature of discharging of pore-forming agent is 300-600° C., and a holding time is 2-12 hours.

3. The method of claim 1, wherein step F) further comprises: placing the green body obtained in the step E) into a graphite crucible and burying it into isolating powders, and then sintering in the box furnace, and a heating rate is 1-20° C./min, a sintering temperature is 900-1400° C., and a holding time is 10-20 hours, wherein the green body is sintered to obtain the semi-finished product of porous ceramic heating body.

4. The method of claim 1, wherein in step A), the porous ceramic substrate slurry is composed of raw materials with weight percentages as follows:
   the diatomaceous earth accounting for 15%,
   the pore-forming agent accounting for 5%,
   the nano-silica solution accounting for 1%,
   the deionized water accounting for 20%,
   the resistive slurry accounting for 34%, and
   the organic solvent accounting for 25%.

5. The method of claim 1, wherein in step A), the porous ceramic substrate slurry is composed of raw materials with weight percentages as follows:
   the diatomaceous earth accounting for 35%,
   the pore-forming agent accounting for 12%,
   the nano-silica solution accounting for 2%,
   the deionized water accounting for 21%,
   the resistive slurry accounting for 20%, and
   the organic solvent accounting for 10%.

6. The method of claim 1, wherein in step A), the porous ceramic substrate slurry is composed of raw materials with weight percentages as follows:
   the diatomaceous earth accounting for 45%,
   the pore-forming agent accounting for 5%,
   the deionized water accounting for 20%,
   the resistive slurry accounting for 20%, and
   the organic solvent accounting for 10%.

7. The method of claim 1, wherein the resistive slurry comprises one or more selected from stainless steel, nickel chromium, and silver palladium.

8. The method of claim 2, wherein the resistive slurry comprises one or more selected from stainless steel, nickel chromium, and silver palladium.

9. The method of claim 3, wherein the resistive slurry comprises one or more selected from stainless steel, nickel chromium, and silver palladium.

10. The method of claim 4, wherein the resistive slurry comprises one or more selected from stainless steel, nickel chromium, and silver palladium.

11. The method of claim 5, wherein the resistive slurry comprises one or more selected from stainless steel, nickel chromium, and silver palladium.

12. The method of claim 6, wherein the resistive slurry comprises one or more selected from stainless steel, nickel chromium, and silver palladium.

13. The method of claim 1, wherein the pore-forming agent is one or more selected from starch, wood chips, carbon powder, and plastic microspheres.

14. The method of claim 2, wherein the pore-forming agent is one or more selected from starch, wood chips, carbon powder, and plastic microspheres.

15. The method of claim 3, wherein the pore-forming agent is one or more selected from starch, wood chips, carbon powder, and plastic microspheres.

16. The method of claim 4, wherein the pore-forming agent is one or more selected from starch, wood chips, carbon powder, and plastic microspheres.

17. The method of claim 5, wherein the pore-forming agent is one or more selected from starch, wood chips, carbon powder, and plastic microspheres.

18. The method of claim 6, wherein the pore-forming agent is one or more selected from starch, wood chips, carbon powder, and plastic microspheres.

\* \* \* \* \*